United States Patent [19]
Wellard

[11] 4,023,833
[45] May 17, 1977

[54] ELBOW COUPLER

[75] Inventor: Terry P. B. Wellard, Pointe-a-Pierre, Trinidad and Tobago

[73] Assignee: Texaco Trinidad, Inc., Pointe-a-Pierre, Trinidad and Tobago

[22] Filed: Apr. 27, 1976

[21] Appl. No.: 680,931

[52] U.S. Cl. .............................. 285/179; 141/346; 285/210; 285/330

[51] Int. Cl.² ......................................... F16L 41/00

[58] Field of Search .......... 285/179, 210, 209, 208, 285/189, 330, 38; 141/346, 286, 207, 363

[56] References Cited

UNITED STATES PATENTS

| 309,975 | 12/1884 | Nicolai | 285/208 X |
|---|---|---|---|
| 980,901 | 1/1911 | Ballantyne | 285/208 |
| 3,005,968 | 10/1961 | Jones et al. | 285/189 X |
| 3,297,064 | 1/1967 | Moore et al. | 141/346 X |
| 3,322,442 | 5/1967 | Flachbarth | 285/208 |
| 3,563,269 | 2/1971 | Sarsfield | 285/210 X |
| 3,807,465 | 4/1974 | Ginsburgh et al. | 141/346 X |
| 3,842,870 | 10/1974 | Burgess | 141/286 |

Primary Examiner—Thomas F. Callaghan
Attorney, Agent, or Firm—Thomas H. Whaley; Carl G. Ries; Henry C. Dearborn

[57] ABSTRACT

A coupling unit for use in filling tank ships with petroleum products. It is a 90° elbow with a flange for attaching a loading hose, and there is an integral skirt to fit over a hatch opening. Also, there are quick release type bolts with the skirt to hold the unit in place over a hatch opening when loading product.

1 Claim, 2 Drawing Figures

U.S. Patent    May 17, 1977    4,023,833
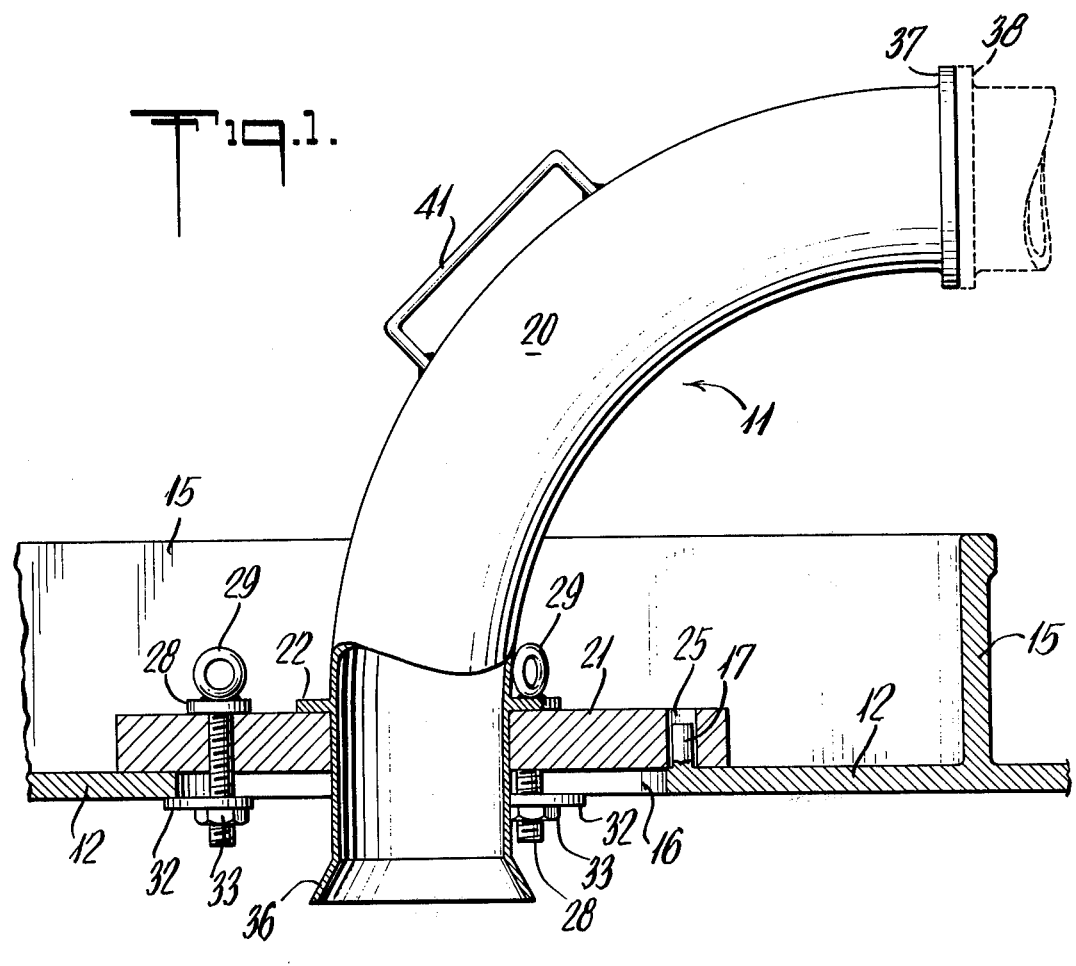
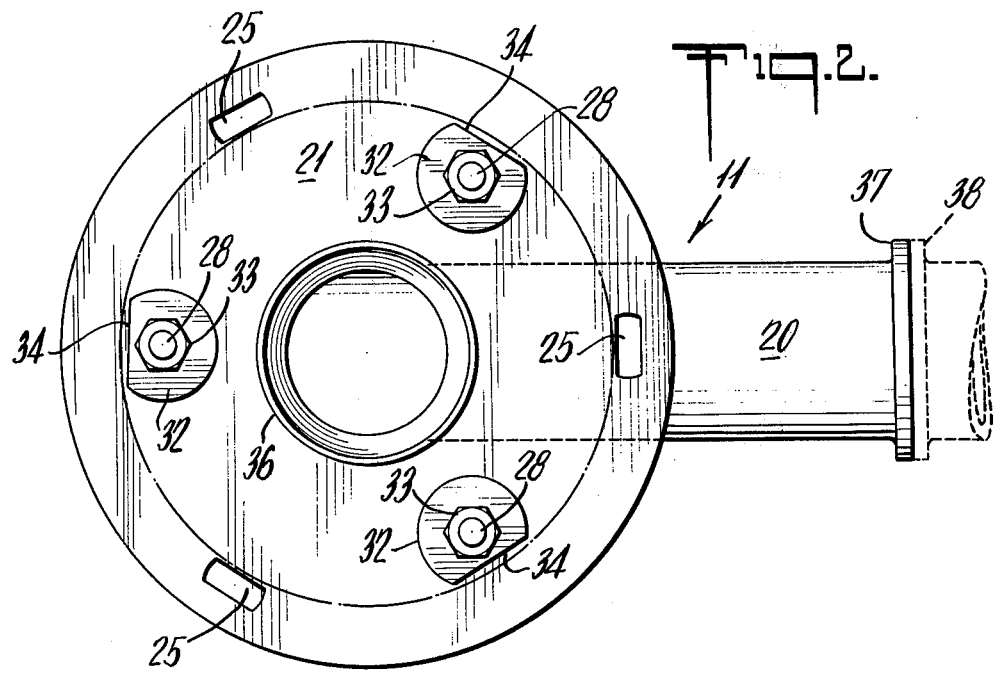

ELBOW COUPLER

BACKGROUND OF THE INVENTION

1. Field of the Invention

This invention concerns a fluid flow coupler, in general. More specifically it deals with a combination that makes up a liquid flow coupling unit which is particularly adapted for use with petroleum tankers when tanks are loaded from deck hatches.

2. Description of the Prior Art

Heretofore, it has been the usual practice in loading tanks of petroleum tankers, to employ a flexible hose that supplies the product. Such hose was lashed in place over the edge of the coaming around a hatch opening located in the top of the tank. The procedure involved handling of the flexible hose in such manner that personnel would enter inside the coaming that surrounds the tank hatch in order to insert the hose into the tank and thereafter to lash the end in order to hold it in place. Among the difficulties and drawbacks encountered were the facts that in such arrangement the hatch opening was not covered during loading. Consequently in bad weather, it was necessary to have special protection as afforded by temporary covers.

Furthermore, the necessity for personnel to enter inside of the coaming that surrounds the hatch opening, created safety hazards since the area would usually be slippery, especially after loading oil. Also, the lashing to hold the hose in place has been known to part and then the hose would jump out of the tank and disperse product in a hazardous manner.

In addition, it has been found that the hose which was lashed in place for loading operations was apt to become kinked where it goes over the coaming around the hatch opening. Consequently, the hose became worn more rapidly than would otherwise be the case which would necessitate costly replacements.

Thus, it is an object of this invention to provide a compact portable coupling unit that overcomes the aforementioned difficulties and provides for easy yet secure attachment of cargo hoses during loading procedures.

SUMMARY OF THE INVENTION

Briefly, the invention concerns an elbow coupling for use in filling tank ships and the like with fluid cargoes. It comrises in combination a relatively short conduit adapted for being attached to a tank hatch, the said conduit has an integrally attached skirt means for closing said hatch around the outside of said conduit. The coupler also comprises quick release means for attaching said skirt means over said hatch.

Once more briefly, the invention concerns an elbow coupling for use in filling petroleum cargo tanks having a hatch opening surrounded by a coaming. The coupler comprises in combination an arcuate shaped conduit extending about ninety-degrees, and an integrally attached skirt located on and adjacent to one end of said conduit and adapted for closing said hatch opening around the outside of said conduit. It also comprises a plurality of holes in said skirt for matching engagement with studs located around said hatch opening, and quick release means associated with said skirt and comprising a plurality of toggle bolts with means for engaging the edges of said hatch opening when said conduit and skirt are in place over said hatch opening. It also comprises a flared edge on said conduit at the end next to said skirt to reduce splashing, and a flange on the other end of said conduit from said flared edge. The said flange is adapted for coupling a cargo hose thereto, and the said arcuate conduit has a radius sufficient to raise said flange above said coaming when the coupler is in use. The coupler also comprises a handle on the upper surface of said conduit for manually transporting the coupler from one hatch to another.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a elevation partly in cross-section illustrating a coupler according to the invention, in place on a hatch opening in a tank; and FIG. 2 is a bottom plan view of the coupler illustrated in FIG. 1.

DESCRIPTION OF THE PREFERRED EMBODIMENT

As indicated above, a coupling unit according to this invention is especially adapted for use in petroleum tank ship loading procedures. It is a portable elbow coupler that may be firmly attached over a hatch opening in a tanker structure. It facilitates clean and safe operations and avoids hazards and difficulties that were encountered in known prior arrangements and methods used in filling cargo tanks through hatches located on deck.

Referring to FIG. 1, a coupler unit 11 is shown attached in place on the deck, or top 12 of a tank. Such tank top 12 has a coaming 15 that surrounds a hatch opening 16. There are a plurality of studs 17 (only one shown) that are integral with the top 12 of the tank. They are designed for holding in place a hatch cover (not shown) whenever the tank is not being filled.

The unit 11 is made up of an arcuate shaped conduit 20 that has an integrally attached skirt 21 near the lower end thereof. This skirt 21 is preferably attached permenantly to conduit 20 in any feasible manner, e.g. by being welded to a short flange 22 that extends out from the outer surface of the conduit 20. It will be understood that the skirt 21 is of sufficient outside diameter to overlap and close the hatch opening 16 when it is in place thereover.

There are a plurality, e.g. three holes 25 in the skirt 21. These are located for engaging the studs 17 which will keep the unit 11 from sliding around on the deck surface 12 and will hold it in place over the hatch opening 16 before it is secured in place. The attachment is made by quick release means which might take various forms. However, in the illustrated arrangement such means is made up of three toggle bolts 28 that each have an eye ring head structure 29 welded onto the head of each bolt 28. The eye rings 29 are for turning the bolts in order to fasten and release the unit 11 by means of toggle type washers 32 which rotate into engagement underneath the deck surface 12.

It will be understood that the washers 32 are secured against relative rotation with respect to the toggle bolts 28. For example, the washers 32 are threaded to match the threads on the bolts 28, and they are locked in place at the desired location on the bolts by relative tightening with nuts 33, illustrated. The washers 32 are each cut off on a long diameter circulation portion 34, as shown in FIG. 2, so that when they are in the positions illustrated in FIG. 2 the coupling unit 11 is ready to be placed over the hatch opening 16 and onto the studs 17 prior to tightening it into position by turning the toggle bolts 28. Such turning may be readily accomplished by using a short bar (not shown) or the like which would be inserted through the eye rings 29. It will be appreciated that other equivalent quick release arrangements might be employed.

There is a flared edge 36 on the end of the conduit 20 that is next to the skirt 21. This flared edge is for the purpose of reducing splashing, as the product is flowing in through the unit.

At the other end of the conduit 20 there is a flange 37 that is designed to match with the end of a flexible hose 38 which is indicated by the dashed line showing. The coupling structure for thus attaching the hose 38 to the flange 37 is not shown. It, of course, might take various forms.

It will be observed that the radius of the arcuate portion of the conduit 20 is sufficient to have the flange 37 at the upper end of the conduit 20, raised above the coaming 15 when the unit 11 is in place. An important purpose is to adequately clear the hose 38 above the coaming and any other structure (not shown) which might interfere.

It is desirable to have a handle 41 attached to the unit in any feasible manner. As illustrated, it is connected on the upper outside surface of the conduit 20. It is of course very convenient for use in transporting the coupler unit 11 from one hatch opening 16 to another, as different cargoes are loaded.

While a particular embodiment of the invention has been described above in considerable detail in accordance with the applicable statues, this is not to be taken as in any way limiting the invention but merely as being descriptive thereof.

I claim:
1. Elbow coupler for use in filling petroleum cargo tanks having a hatch opening surrounded by a coaming, comprising in combination
   an arcuate shaped conduit extending solely about 90°,
   an integrally attached skirt located on and adjacent to one end of said conduit and adapted for closing said hatch opening around the outside of said conduit,
   a plurality of holes in said skirt for matching engagement with studs located around said hatch opening,
   quick release means associted with said skirt and comprising a plurality of toggle bolts with means for engaging the edges of said hatch opening when said conduit and skirt are in place over said hatch opening,
   a flared edge on said conduit at the end next to said skirt to reduce splashing,
   a flange on the other end of said conduit from said flared edge,
   said flange being adapted for coupling a cargo hose thereto,
   said arcuate conduit having a radius sufficient to raise said flange above said coaming when the coupler is in use, and
   a handle on the upper surface of said conduit for manually transporting the coupler from one hatch to another.

* * * * *